(12) United States Patent
Mergenthaler et al.

(10) Patent No.: US 11,056,006 B2
(45) Date of Patent: Jul. 6, 2021

(54) DEVICE AND METHOD FOR PROVIDING STATE INFORMATION OF AN AUTOMATIC VALET PARKING SYSTEM

(71) Applicant: Robert Bosch GmbH, Stuttgart (DE)

(72) Inventors: Alexander Mergenthaler, Weinstadt (DE); Andreas Lehn, Ludwigsburg (DE); Karan Patel, Chicago, IL (US); Martin Kroeger, Stuttgart (DE); Roman Wack, Munich (DE); Simone Bosatelli, Stuttgart (DE); Stefan Nordbruch, Kornwestheim (DE); Stefan Schaupp, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/632,078

(22) PCT Filed: Jun. 27, 2018

(86) PCT No.: PCT/EP2018/067202
§ 371 (c)(1),
(2) Date: Jan. 17, 2020

(87) PCT Pub. No.: WO2019/015927
PCT Pub. Date: Jan. 24, 2019

(65) Prior Publication Data
US 2020/0234593 A1 Jul. 23, 2020

(30) Foreign Application Priority Data
Jul. 21, 2017 (DE) .......................... 102017212533.0

(51) Int. Cl.
*G08G 1/16* (2006.01)
*B60W 30/06* (2006.01)
(Continued)

(52) U.S. Cl.
CPC .............. *G08G 1/168* (2013.01); *B60W 30/06* (2013.01); *G08G 1/0116* (2013.01); *G08G 1/143* (2013.01);
(Continued)

(58) Field of Classification Search
CPC ........ G08G 1/168; G08G 1/144; G08G 1/149; B60W 30/06
(Continued)

(56) References Cited

U.S. PATENT DOCUMENTS 9,421,909 B2 * 8/2016 Strickland .............. B60Q 9/008
9,505,412 B2 * 11/2016 Bai ........................ B60K 37/06
(Continued)

FOREIGN PATENT DOCUMENTS

DE 102015201209 A1 7/2016
DE 102015208068 A1 11/2016
(Continued)

OTHER PUBLICATIONS

International Search Report for PCT/EP2018/067202, dated Oct. 11, 2018.

*Primary Examiner* — John A Tweel, Jr.
(74) *Attorney, Agent, or Firm* — Norton Rose Fulbright US LLP; Gerard Messina

(57) ABSTRACT

A device is described for providing state information of an automatic valet parking system. The device includes at least one off-board infrastructure component, which is located, in particular fixedly disposed within a parking area assigned to the automatic valet parking system. The infrastructure component is adapted for outputting state information of the automatic valet parking system. Thus, pieces of state information of the automatic valet parking system can be efficiently communicated.

22 Claims, 3 Drawing Sheets

(51) Int. Cl.
*G08G 1/01* (2006.01)
*G08G 1/14* (2006.01)

(52) U.S. Cl.
CPC ............ *G08G 1/144* (2013.01); *G08G 1/146* (2013.01); *G08G 1/149* (2013.01)

(58) Field of Classification Search
USPC ...................................................... 340/932.2
See application file for complete search history.

(56) References Cited

U.S. PATENT DOCUMENTS

| | | | |
|---|---|---|---|
| 10,373,226 B1* | 8/2019 | Russell | G06Q 30/0613 |
| 10,730,556 B2* | 8/2020 | Nicodemus | B62D 15/0285 |
| 2010/0156672 A1* | 6/2010 | Yoo | G08G 1/14 |
| | | | 340/932.2 |
| 2010/0161128 A1 | 6/2010 | Choi et al. | |
| 2020/0132473 A1* | 4/2020 | Shipley | G01S 19/49 |
| 2020/0160720 A1* | 5/2020 | Rivera | G08G 1/005 |

FOREIGN PATENT DOCUMENTS

| | | |
|---|---|---|
| DE | 102015218350 A1 | 3/2017 |
| KR | 20090020222 A | 2/2009 |

\* cited by examiner

DEVICE AND METHOD FOR PROVIDING STATE INFORMATION OF AN AUTOMATIC VALET PARKING SYSTEM

FIELD

The present invention relates to a device and a method for providing state information of an automatic valet parking system. The present invention also relates to an automatic valet parking system. In addition, the present invention relates to a computer program.

BACKGROUND INFORMATION

German Patent Application No. DE 10 2015 201 209 A1 describes a valet parking system for automatically taking a vehicle from a transfer zone to an assigned parking space within a specified parking area. This system includes a parking lot monitoring system having at least one fixedly disposed sensor unit. The parking lot monitoring system is designed for localizing the vehicles driving within the specified parking area.

SUMMARY

An object of the present invention is to provide for efficiently providing pieces of state information by way of an automatic valet parking system, so that, for example, other road users, who are moving within the parking area assigned to the automatic valet parking system, may adapt their behavior and avoid danger, for example.

A first aspect of the present invention provides an example device for providing state information of an automatic valet parking system (also referred to as an AVP system). The device includes at least one off-board infrastructure component, which is located, in particular fixedly disposed within a parking area assigned to the automatic valet parking system. The infrastructure component is adapted for outputting state information of the automatic valet parking system. Thus, pieces of state information of the automatic valet parking system may be efficiently communicated.

In accordance with an example embodiment of the present invention, at least one infrastructure component is adapted for acoustically outputting the state information. For that purpose, the infrastructure component may, in particular have a loudspeaker. The state information may be output in the form of tones, read-out texts, announcements or the like.

In accordance with an example embodiment of the present invention, at least one infrastructure component is adapted for visually outputting the state information. In this regard, the infrastructure component may, in particular have a video screen and/or a signal light and/or an illumination device, such as a lamp, for example, one or a plurality of LEDs and/or a flag indicator and/or a sign, in particular an illuminated sign. The state information may be output in the form of light signals, color signals, displayed texts, symbols or the like. The term illumination device may also be understood as a lamp that may assume different states, for example, is able to output different colors and/or blinking patterns.

In accordance with an example embodiment of the present invention, at least one infrastructure component is adapted for haptically outputting the state information. For that purpose, the infrastructure component may, in particular have a component that is recessed in the ground of the parking area, such as a plate that is movable. The state information may be output in the form of vibrations and/or directed movements of the plate.

The infrastructure component(s) is/are preferably secured, for example, to the ground, the wall, the roof, to railings or other structural elements of the parking area. In a variant, the infrastructure component(s) may have a housing that is provided exclusively for the infrastructure component. Alternatively, an infrastructure component may be integrated in another component already present in the parking area, for example, in an illumination system or a surroundings monitoring system.

In one possible embodiment of the present invention, existing components are also used by other systems already present in the parking area (for example, loudspeaker systems or alarm systems) for outputting the state information.

Thus, it may also be provided that the infrastructure component be adapted for outputting at least second information, for example, an alarm or an announcement. The second information may include either further state information of the automatic valet parking system or different information.

The state information preferably includes information about a current operating state of the automatic valet parking system. In one variant, the state information is information that an automatic valet parking system or an automatic valet parking service is being used in the parking area, i.e., what are generally referred to as AVP vehicles in the parking area are driven and parked in an automated manner, thus without a driver. This may be accomplished by displays ("advertising text"), for example, containing detailed pieces of information about the automated valet parking system. In a variant, the state information includes a current operating state of the system, such as:

The AVP system is in operation or not in operation. The output then follows via a status lamp and/or corresponding text, for example.
The AVP system is operating error-free. The output then takes place by a green (LED) illuminating lamp, for example.
There is an error in the AVP system. The output then takes place by a red (LED) illuminating lamp, for example.
The AVP system is in an unknown state. The output then takes place by a yellow illuminating (LED) lamp, for example.

The state information preferably includes information about an action currently being performed and/or a future action of a vehicle that is moving within the parking area in an automated manner. In a preferred embodiment of the present invention, the state information alternatively or additionally includes information about a current position, and/or a current direction of movement, and/or a future position, and/or a current direction of movement of a vehicle that is moving within the parking area in an automated manner.

These types of pieces of current state information may include, for example,
the AVP vehicle is driving off;
the AVP vehicle is braking;
the AVP vehicle is parking.

Future, in particular imminent actions may yield one of the following pieces of state information, for example:
the AVP vehicle will drive away in X seconds (X=10 seconds, for example);
the AVP vehicle is about to come around a specific corner;
the AVP vehicle will soon drive to the left or right;

the AVP vehicle will be parked soon in a specific parking space, it also being possible for an identification of the parking space to be output at the same time.

This type or these types of pieces of state information may, in particular be output visually, for example, in the form of text or symbols displayed by an infrastructure component. Alternatively or additionally, this type or these types of pieces of state information may, in particular be output acoustically, for example, in the form of announcements or the playing back of spoken texts.

Thus, the benefit is derived that other road users, in particular pedestrians, are informed about the current movements of the AVP vehicles, and dangerous situations may thereby be efficiently avoided.

In another variant, pieces of state information are output for the system operator. These are AVP system-internal pieces of information, such as system information, in particular information about a system error, such as "no communication from the AVP system to the AVP vehicle," and/or debug information, such as "error A in component X following operational step Z," "A" standing for an error detection, "X" for the affected vehicle component or component of the AVP system, and "Z" for an identification of an affected operational step. Thus, debug information is specific error information where precise pieces of information are communicated about the type and occurrence of a system error. Thus, the benefit is derived, for example, that technical personnel of the AVP system, for example, are able to quickly detect and correct errors.

Moreover, the pieces of state information may include information about an action currently being performed, and/or a future action of a parking area component, in particular a mechanical parking area component, the parking area component being, in particular a barrier and/or a gate and/or a door and/or an obstacle. In this way, the benefit is also derived that dangerous situations, that could arise for other road users or pedestrians from the imminent movement of parking area components, are efficiently avoided.

A second aspect of the present invention provides an example method for providing state information of an automatic valet parking system that at least includes the steps of:

acquiring state information of the automatic valet parking system;

outputting the state information using a device adapted in the manner described above.

Technical functionalities of the method are derived analogously from the corresponding technical functionalities of the device and vice versa.

In a preferred embodiment of the example method, a plurality of infrastructure components are provided, the state information being output to selected infrastructure components as a function of an acquired current situation of the system, and/or of a current situation in the parking area and as a function of the particular position of the infrastructure components. Thus, the communication via the infrastructure components may be selectively adapted to the situation within the parking area. For example, communication is only carried out via those infrastructure components in whose surroundings, people, road users, vehicles, etc. are located. The current situation may thereby be sensed or analyzed, for example, by a central parking management device of the AVP system and the surroundings monitoring system thereof (for example, cameras, lidar sensors). It is thus possible to efficiently output the state information, so that an output only takes place via those infrastructure components where the recipients are also able to perceive the same. Thus, an efficient operation of the infrastructure components is made possible, particularly in the case of a visual outputting of pieces of state information.

The state information may preferably be additionally output by an output system of a vehicle that is moving within the parking area in an automated manner, for example, acoustically (for example, by a horn, loudspeaker, . . . ) and/or visually (for example, by vehicle lighting, flashers, supplementary lights, interior illumination of the vehicle, . . . ) and/or "haptically" (for example, by rapid movements of the vehicle).

Moreover, the state information may additionally be transmitted to a mobile device, in particular a smart phone and/or an on-board communication device.

A third aspect of the present invention provides an example computer program that includes program code for implementing a method according to the present invention for providing state information of an automatic valet parking system when the computer program is executed on a computer.

A fourth aspect of the present invention provides an example automatic valet parking system (AVP) system that includes a device designed in accordance with the present invention and a central parking management device. The example parking management device is designed for acquiring state information of the automatic valet parking system and for controlling at least one infrastructure component to output the state information.

A fifth aspect of the present invention provides an example infrastructure component, in particular for use in a device designed in accordance with the present invention and/or in a method realized in accordance with the present invention and/or in an automatic valet parking system designed in accordance with the present invention. The example infrastructure component is designed to be fixedly disposed within a parking area and is adapted for outputting state information of an automatic valet parking system.

In a preferred variant, the infrastructure component includes a support portion and at least one illumination device, the illumination device being designed to assume different states, a particular state being associated with specific state information of the automatic valet parking system.

It is especially preferred that a state of the illumination device be characterized by a light color and/or a blinking pattern, it being possible for each light color and each blinking pattern and/or combinations thereof to correspond to specific state information of the automatic valet parking system.

DETAILED DESCRIPTION OF EXAMPLE EMBODIMENTS

Figure 1:
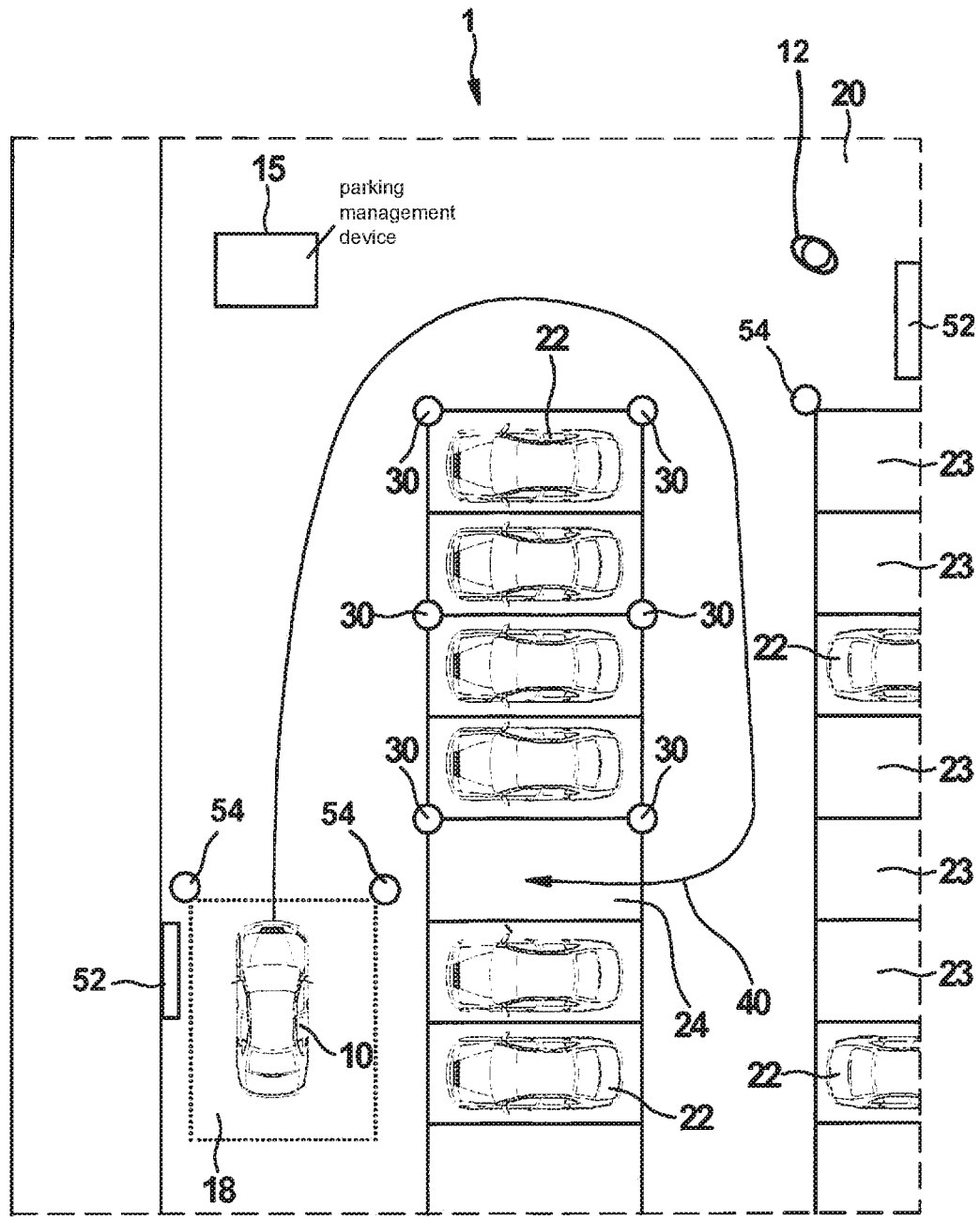
FIG. 1 shows a schematic view of a parking area in which an automatic valet parking system is operated.

In the following description of exemplary embodiments of the present invention, the same reference numerals denote identical elements; if indicated, there being no need to repeat the description of these elements. The figures represent the subject matter of the present invention only schematically.

FIG. 1 shows exemplarily a view of a portion of a parking area 20, which is part of an AVP system. Parking area 20 has various parking spaces 23 for AVP vehicles. Parking area 20 includes a transfer zone 18, where a vehicle 10 may be handed over to the operator of parking lot 20. For that purpose, the driver of vehicle 10 drives his/her vehicle 10 into transfer zone 18, leaves his/her vehicle 10 and hands it over to the operator of parking lot 20.

To monitor vehicle 10, which is moving within parking lot 20, a surroundings monitoring system, which includes a plurality of surroundings sensors 30 in the form of lidar sensors, is assigned to parking lot 20.

Once vehicle 10 is transferred to parking lot operator, a parking management device 15, for example, a server, assigns an available parking space, as parking position 24, from possible available parking spaces 23, to vehicle 10. In the figure, reference numeral 22 characterizes already occupied parking spaces.

Once the parking position is assigned, vehicle 10 is moved to assigned, available parking space 24. Vehicle 10 is adapted, for example, for executing a driving maneuver autonomously with the aid of a parking assistance system. Parking management device 15 is granted access to the parking assistance system, so that vehicle 10 is able to move autonomously in parking lot 20 and independently head for parking position 24. In accordance with the present invention, parking management device 15 transmits the relevant pieces of information to vehicle 10, allowing vehicle 10 to be guided autonomously along a trajectory 40 within parking area 20 on the basis of the pieces of information. Alternatively, vehicle 10 may be remotely controlled along trajectory 40 to parking position 24.

In accordance with the present invention, located within the parking area are fixedly disposed infrastructure components 52 and 54, which are adapted for outputting one or a plurality of pieces of state information of automatic valet parking system 1. The pieces of state information are acquired by parking management device 15, for example, by surroundings sensors 30. Parking management device 15 controls infrastructure components 52 and 54 to output the state information. The relevant control commands may be transmitted wirelessly or by wire, for example.

In this example, infrastructure components 52 are in the form of display panels or displays upon which the pieces of state information are shown as images or text. In this way, a person 12, who is moving by foot within parking area 20, is able to be informed about a current state of valet parking system 1. For example, relevant text and/or symbols may indicate that an AVP vehicle 10 will soon be moving in the vicinity of infrastructure component 52, and/or that the valet parking system is in operation. A driver, who is dropping off or picking up his/her vehicle 10 at transfer zone 18, may also be informed about the current state via infrastructure components 52, 54 located in the area of the transfer zone. In this example, infrastructure components 54 are illumination devices having multicolored LEDs, through which state information of valet parking system 1 is output, as illustrated in greater detail in FIG. 2.

Figure 2:
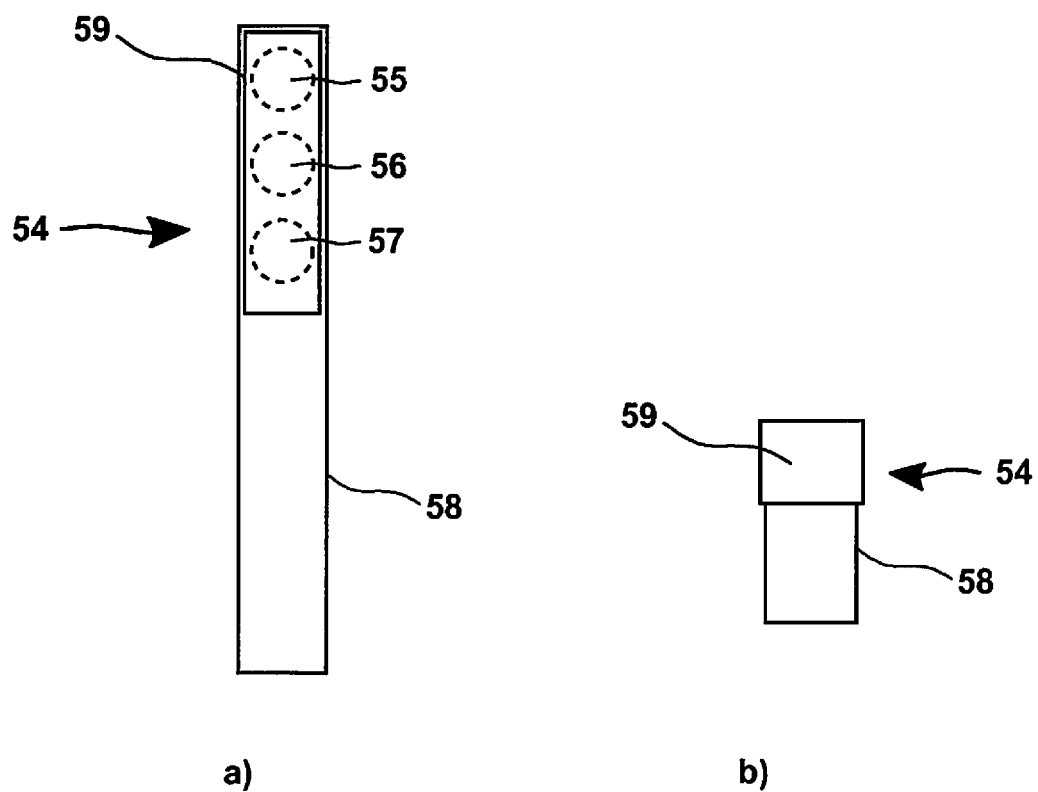
FIGS. 2a) and b) schematically show two examples of infrastructure components designed in accordance with the present invention for visually outputting state information of a valet parking system.

Two examples of possible designs of an infrastructure component 54 are schematically shown in FIG. 2.

Infrastructure component 54 of FIG. 2a) has a column like support portion 58, as well as an illumination device 59. In this example, illumination device 59 includes three LED units 55, 56 and 57, each including LEDs of a different color.

Thus, first LED unit 55 may include red LEDs, second LED unit 56 yellow LEDs, and third LED unit 57 green LEDs.

Infrastructure component 54 is configured for outputting state information that represents information about a current operating state of automatic valet parking system 1. If AVP system 1 is operating error-free, infrastructure component 54 is controlled in such a way, for example, that exclusively third LED unit 57 lights up. If AVP system 1 has an error, infrastructure component 54 is controlled in such a way, for example, that exclusively first LED unit 55 lights up. If AVP system 1 is in an unknown operating state, infrastructure component 54 is controlled in such a way, for example, that exclusively second LED unit 56 lights up. Alternatively or additionally, illumination device 59 may be controlled in such a way that blinking patterns are produced that represent a state information.

Infrastructure component 54, schematically shown in FIG. 2b), likewise includes a support portion 58, which, however, is shorter in comparison to FIG. 2a), and includes an illumination device 59. Illumination device 59 may be designed to assume different states that represent different pieces of state information. As described in connection with FIG. 2a), the states may be represented by different colors and/or blinking patterns, for example.

Figure 3:
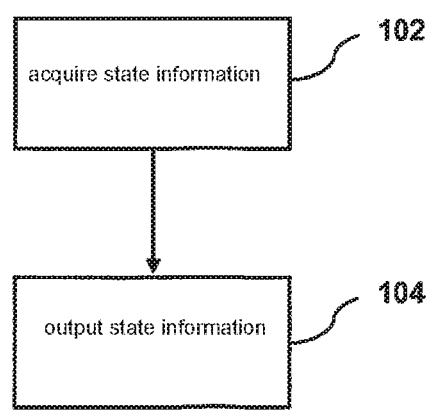
FIG. 3 is a flow chart of a method in accordance with an embodiment of the present invention.

FIG. 3 shows a flow chart of a method in accordance with an embodiment of the present invention.

In a first step of 102, at least one piece of state information of an automatic valet parking system is acquired.

In a second step 104, the state information is output. The output is carried out using one or a plurality of infrastructure components, which are fixedly disposed within a parking area assigned to the automatic valet parking system and adapted to output the state information, for example, audibly and/or visually and/or haptically.

What is claimed is:

1. A device for providing state information of an automatic valet parking system, comprising:
at least one off-board infrastructure component which is located fixedly disposed within a parking area assigned to the automatic valet parking system and is configured to visually output state information of the automatic valet parking system,
wherein the state information visually output by the at least one off-board infrastructure component includes information about a current position of a vehicle that is moving within the parking area in an automated manner, and/or a current direction of movement of the vehicle that is moving within the parking area in the automated manner, and/or a future position of the vehicle that is moving within the parking area in the automated manner.

2. The device as recited in claim 1, wherein at least one of the at least one infrastructure component is configured to acoustically output the state information.

3. The device as recited in claim 1, wherein the infrastructure component including a video screen, and/or a signal light, and/or an illumination device, and/or a flag indicator.

4. The device as recited in claim 1, wherein at least one of the at least one infrastructure component is configured to haptically output the state information.

5. The device as recited in claim 1, wherein at least one of the at least one infrastructure component includes a housing that is provided exclusively therefor.

6. The device as recited in claim 1, wherein at least one of the at least one infrastructure component is integrated in another component of the parking area.

7. The device as recited in claim 1, wherein the infrastructure component is configured to output at least second information.

8. The device as recited in claim 1, wherein the state information includes information about a current operating state of the automatic valet parking system.

9. The device as recited in claim 1, wherein the state information includes information about an action currently being performed by the vehicle that is moving within the parking area in an automated manner and/or a future action of the vehicle that is moving within the parking area in the automated manner.

10. The device as recited in claim 1, wherein the state information includes system information about a system error and/or debug information.

11. The device as recited in claim 1, wherein the state information includes information about an action currently being performed by a parking area component and/or a future action of the parking area component, the parking area component being a barrier and/or a gate and/or a door and/or an obstacle.

12. A method for providing state information of an automatic valet parking system, comprising the following steps:
  acquiring state information of the automatic valet parking system; and
  visually outputting the state information using a device including at least one off-board infrastructure component which is located fixedly disposed within a parking area assigned to the automatic valet parking system and is configured to output the acquired state information of the automatic valet parking system,
  wherein the state information visually output by the at least one off-board infrastructure component includes information about a current position of a vehicle that is moving within the parking area in an automated manner, and/or a current direction of movement of the vehicle that is moving within the parking area in the automated manner, and/or a future position of the vehicle that is moving within the parking area in the automated manner.

13. The method as recited in claim 12, wherein the at least one infrastructure component includes a plurality of infrastructure components, state information being output to selected infrastructure components of the plurality of infrastructure components as a function of a current situation of the automatic valet parking system and/or a current situation in the parking space and a respective position of the infrastructure components.

14. The method as recited in claim 12, wherein the state information is additionally output by an output system of a vehicle that is moving within the parking area in an automated manner.

15. The method as recited in claim 12, wherein the state information is additionally transmitted to a communication device of a vehicle.

16. A non-transitory computer-readable medium on which is stored a computer program including program code for providing state information of an automatic valet parking system, the computer program, when executed by a computer, causing the computer to perform:
  acquiring state information of the automatic valet parking system; and
  visually outputting the state information using a device including at least one off-board infrastructure component which is located fixedly disposed within a parking area assigned to the automatic valet parking system and is configured to output the acquired state information of the automatic valet parking system,
  wherein the state information visually output by the at least one off-board infrastructure component includes information about a current position of a vehicle that is moving within the parking area in an automated manner, and/or a current direction of movement of the vehicle that is moving within the parking area in the automated manner, and/or a future position of the vehicle that is moving within the parking area in the automated manner.

17. An automatic valet parking system, comprising:
  a device for providing state information of the automatic valet parking system, the device including at least one off-board infrastructure component which is located fixedly disposed within a parking area assigned to the automatic valet parking system and is configured to visually output the state information of the automatic valet parking system; and
  a central parking management device which is configured to acquire the state information of the automatic valet parking system and to control the infrastructure component to visually output the state information,
  wherein the state information visually output by the at least one off-board infrastructure component includes information about a current position of a vehicle that is moving within the parking area in an automated manner, and/or a current direction of movement of the vehicle that is moving within the parking area in the automated manner, and/or a future position of the vehicle that is moving within the parking area in the automated manner.

18. An infrastructure component which is located fixedly disposed within a parking area assigned to an automatic valet parking system and is configured to visually output state information of the automatic valet parking system,
  wherein the state information visually output by the at least one off-board infrastructure component includes information about a current position of a vehicle that is moving within the parking area in an automated manner, and/or a current direction of movement of the vehicle that is moving within the parking area in the automated manner, and/or a future position of the vehicle that is moving within the parking area in the automated manner.

19. The infrastructure component as recited in claim 18, wherein the infrastructure component includes a support portion and at least one illumination device, the illumination device being configured to assume different states, each respective one of the states being associated with respective specific state information of the automatic valet parking system.

20. The infrastructure component as recited in claim 19, wherein each of the states of the illumination device being characterized by a light color and/or a blinking pattern.

21. The device as recited in claim 1, wherein at least one of the at least one infrastructure component includes a video screen.

22. The device as recited in claim 1, wherein the information about the current position, current direction, and/or future position of the vehicle is information about the current position, current direction, and/or future position of the vehicle in the vicinity of the infrastructure component.

* * * * *